Aug. 18, 1953
H. NOYES
2,649,275
SHUTOFF OR SELECTOR VALVE HAVING
A RESILIENT SHEET METAL ROTOR
Filed June 3, 1949
2 Sheets—Sheet 2
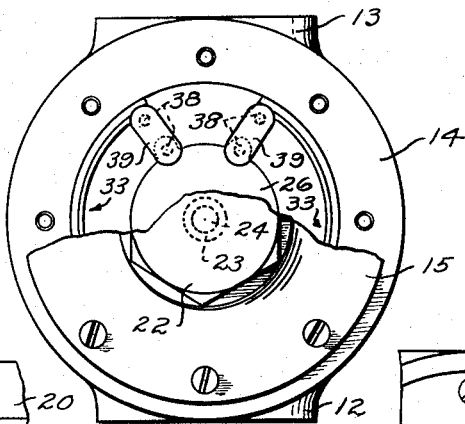
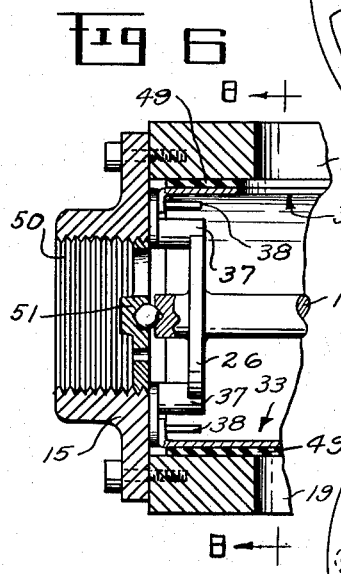
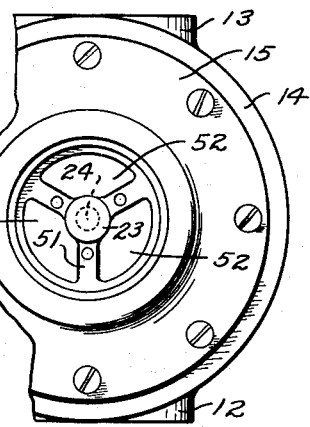
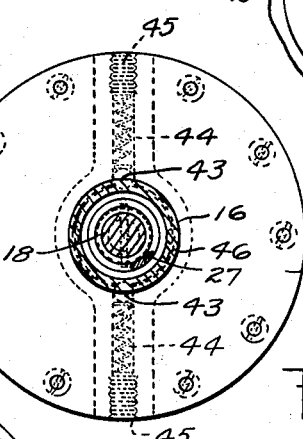
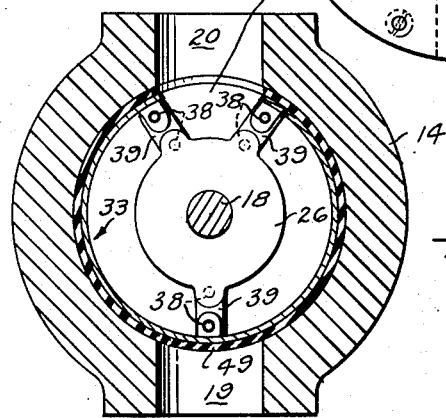
INVENTOR.
HOWARD NOYES
BY

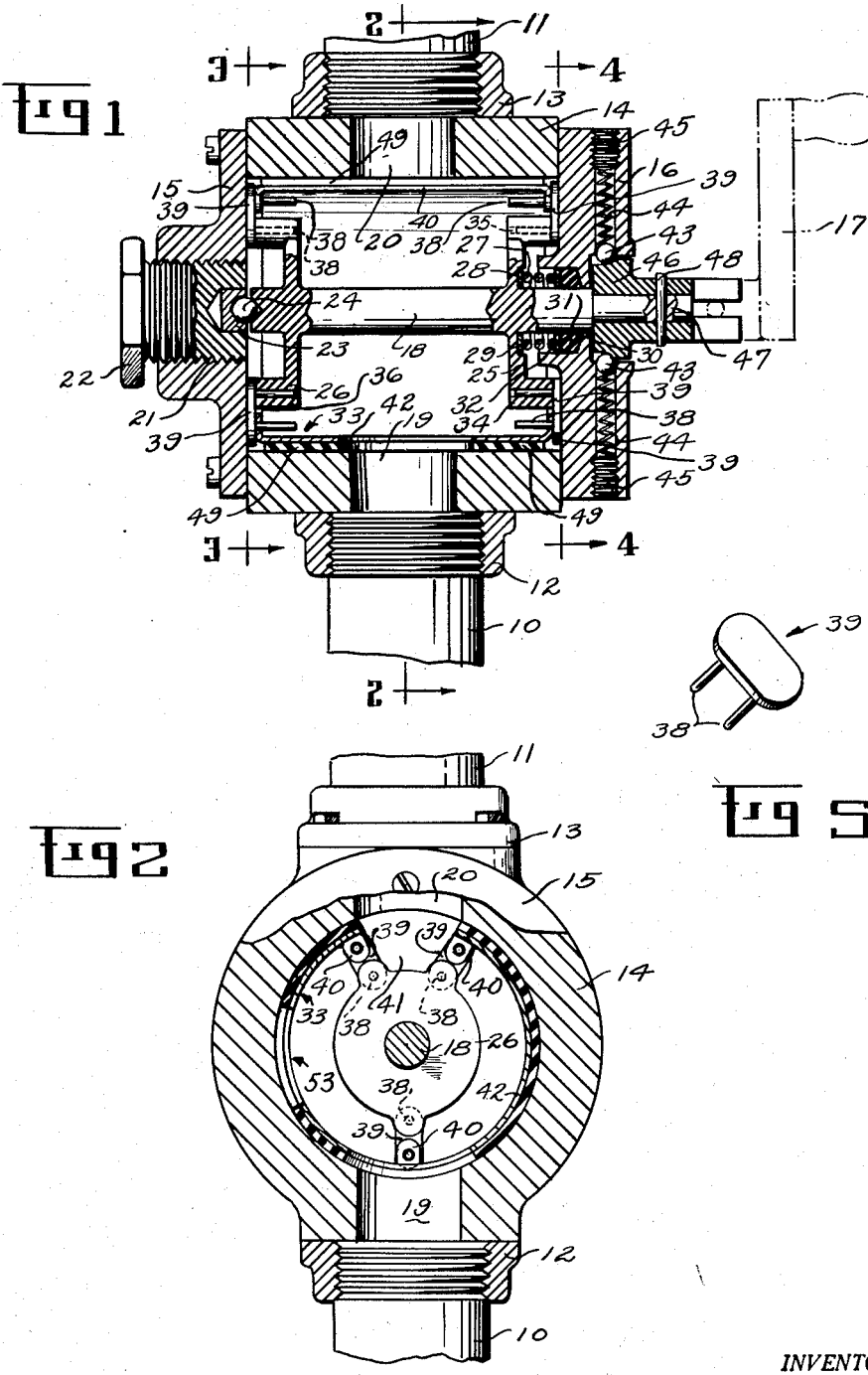

Patented Aug. 18, 1953

2,649,275

UNITED STATES PATENT OFFICE 2,649,275

SHUTOFF OR SELECTOR VALVE HAVING A RESILIENT SHEET METAL ROTOR

Howard Noyes, Dayton, Ohio

Application June 3, 1949, Serial No. 97,068

7 Claims. (Cl. 251—96)

(Granted under Title 35, U. S. Code (1952), sec. 266)

The invention described herein may be manufactured and used by or for the United States Government for governmental purposes without payment to me of any royalty thereon.

This invention relates to a valve of the rotor type which may be either a shutoff or selector valve. A characteristic feature of the invention is the employment of a resilient valve rotor or plug which is spring-loaded to provide sealing contact between it and the housing of the valve.

Among the objects of this invention are to provide a valve of the above type, the body of which may be fabricated from a large variety of materials such as reinforced plastic, aluminum, steel, etc., by molding, stamping, by casting or the like, and the rotor or plug of which can be fabricated of light sheet metal so as to have considerable outwardly-directed resilience.

Another object of the invention is to provide a valve of the above character in which the sealing surface is a soft material which can be attached either to the outside of the rotor or to the inside of the housing. Such sealing material may be any of a large number of different kinds of synthetic rubber, sheet plastics or other elastomers, lead or even carbonaceous material including graphite. My invention is intended to reduce the amount of wear on such soft material by reducing sliding friction when the valve is operated.

Another object is to provide a valve of the above character which is protected against leakage by internal inlet pressure tending to keep the resilient rotor or plug in contact with the housing when the valve is closed.

Another object is to provide a valve which can be easily indexed.

Another object is to provide a valve of the above character the rotor of which is adapted to be rotated as easily and as effectively in one direction as the other i. e., clockwise or counterclockwise.

In this specification and claims, the words "rotor" or plug are used respectively to mean a rotatable body of generally cylindrical shape and a rotatable body of conical shape. The cylindrical shape is the preferred form, but one is the full equivalent of the other.

In the drawings—

Fig. 1 is a cross-section of a shutoff valve according to my invention, when such valve is mounted in a vertical pipe.

Fig. 2 is another view mainly in vertical cross-section of the valve shown in Fig. 1 taken substantially on the line 2—2 thereof.

Fig. 3 is taken along the line 3—3 of Fig. 1 and shows an end view of the valve as shown therein, the cover plate at the left side of the valve being shown as partly removed.

Fig. 4 is a side elevation and partial cross-section of the cover assembly at the right hand side of Fig. 1, Fig. 4 being taken along the line 4—4 of Fig. 1.

Fig. 5 is an isometric view of a link which is used to connect a sheet metal part of a rotor with its actuating mechanism. This form of link may be used either for shutoff or selector valves.

Fig. 6 is a view of a selector valve showing a cross-section, the entrance port and the construction of the means for admitting liquid into the rotor.

Fig. 7 is a side elevation of the selector valve shown in Fig. 6.

Fig. 8 is a vertical section of a selector valve as shown in Fig. 6, the section being taken on the line 8—8 of Fig. 6.

Referring now to Fig. 1, 10 and 11 are respectively the ends of a pipe line in which the valve is inserted through flanges 12 and 13 respectively. The valve comprises a generally cylindrical body 14 which is provided with a left hand cover 15 and a right hand cover 16 and actuating handle 17, which is shown in dashed line, may be provided to rotate a central shaft 18 which extends across the valve body 14 between the covers 15 and 16. In the valve body 15 there are two openings 19 and 20, which are opposite each other across the valve body, either opening 19 or 20 may be the inlet. In Figs. 1 and 2, the shutoff valve is shown in the open position.

The cover 15 is provided with a gland 21 which can be threadedly adjusted by means of a nut 22. The gland carries centrally a bearing 23 in which there is a cavity for the reception of a single steel ball 24. The function of the ball 24 and bearing 23 is to provide a pivot support for the shaft 18. At the right hand side of the shaft 18 Fig. 1, there is provided a disc 25 which is similar in construction and size to another disc 26 at the left hand end of shaft 18 except that disc 25 is provided with a recess 27 in which there is bedded a hardened washer 28 against which a coil spring 29 bears in compression to hold the shaft 18 against the ball 24. In cover 16 there is a depression 30 in which there is mounted a synthetic rubber O-ring 31, surrounding the shaft 18 and sealing it. The O-ring 31 is surmounted by a hardened washer 32 which also receives the thrust of the coil spring 29.

Rotatably mounted in the valve body 14, there is a sheet metal resilient rotor or plug 33 which is here shown as being cylindrical in form. Its cylindrical form is referred to in this specification as a rotor, but the head may be conical, and in this event it is herein referred to as a plug. It is to be understood that the cylindrical and conical forms are the full equivalents of each other but that the term "rotor" is generic to "plug." The rotor is made of spring-tempered metal having a fairly strong tendency to press against the inner wall of the valve body 14.

The connections between the discs 25 and 26 comprise the struts 34, 35, 36 and 37. These struts are drilled lengthwise with small diameter holes to accommodate one of the shanks 38 of a link 39 with a sliding fit. The shape of the link is shown in Fig. 5. The other shank extends through a lug 40 at both of the outer extremities of the sheet metal rotor 33. The number of lugs employed on each end of the rotor is three or more and they are shown in Fig. 2, thus the metal rotor wall 42 is connected pivotally with the shaft 18 through the discs 25 and 26 at three points at each end of the shaft 18. The middle portions of the struts may be eliminated, so that the discs 25 and 26, or equivalent projections from the shaft 18 may be connected jointedly to the rotor wall.

As will be seen in Fig. 2, the connections just spoken of are arranged in a Y-shape. Between the two upper prongs of the Y there is an opening 41 in the metal wall 42 of the rotor 33 which opening amounts to a split of the wall 42 for the entire length of the rotor 33, thus providing the equivalent of a port. The split or opening 41 which is substantially as wide as the openings 19 or 20 of the valve body 14 provides the necessary space for a contraction in the circumference of the rotor 33 when the shaft 18 is rotated by turning the handle 17 in either direction.

When handle actuation occurs, shaft 18 and discs 25 and 26 are rotated and a pull is exerted in the direction of actuation on one of the shanks 38, thereby pulling the rotor wall 42 inward through their connection with the links 39 and the lugs 40. Opening 41 thereupon tends to contract and the rotor 33 becomes smaller in both circumference and diameter as it is pulled away from the inside of the wall of body 14.

As soon as the rotor 33 is substantially out of contact with the body wall it can be freely rotated within the body 14. To allow the wall 42 again to press against the body wall, it is merely necessary to cease to rotate the handle 17. The rotor can be set at any position, but for the purpose of recognizing the appropriate stations, an indexing feature, which will now be described, is provided.

Referring again to Figs. 1 and 4, the cover 16 is provided with detents which comprise balls 43, coil springs 44 and set screws 45 all contained within holes drilled from the edge of the cover to the center. The balls 43 fit into holes on the periphery of a hub 46 which fits about the shank 47 of the shaft 18, to which shank it is attached by a cross pin 48. Any desired number of stations can be provided by drilling shallow holes in the hub 46 at desired locations. One of these stations should of course be at an open position of the rotor and a second should be at a full closed position. For special purposes, the indexing structure may be omitted entirely.

A distinctive feature of the present invention is the provision of a layer of soft sealing material 49 attached either to the outer circumference of the rotor 33 or attached to the inner wall of the body 14. If attached to the body wall, the layer 49 is stationary; if attached to the rotor, the sealing material moves with it. Preferably the sealant is attached to the rotor. The preferred material is synthetic rubber having the least swelling characteristics in motor fuel.

An opening 53 (Fig. 2) may be provided in the wall of the rotor 33 and through the soft sealing material 49 for the purpose of admitting inlet pressure to the interior of the rotor 33. Such pressure compresses the sealing material 49 by applying outward pressure to the rotor wall. The opening 53 should extend from top to bottom of the sealing material 49 but should not extend so far in the rotor wall. The provision of the opening 53 is optional. It may take the form of a groove, but it should be located where it will be subject to inlet pressure when the valve is closed.

Referring now particularly to Figs. 6, 7 and 8, the inlet 50 is at the left side of Fig. 6 and is shown in plan in Fig. 7. In this form of the valve, which is selective, the inlet opening 50, which in the previously described form accommodated the gland 21, accommodates a spider nut 51 which provides several openings 52 through which liquid can pass; the spider nut at the same time providing support for a ball 24 and the shaft 18 by a bearing 23. The interior of rotor 33 can therefore be filled with liquid which must be directed to only one outlet at any one time. The rotor 33 in this form of valve, as will be seen in Fig. 8, has only one side opening which is the split 41. Therefore the selectivity of the valve is obtained by adjusting the rotor 33 so that the split or opening 41 is opposite either opening 19 or opening 20, whichever is desired, in which case the valve is open. If opening 41 is opposite the blank inner wall of the body 14, the valve is closed.

I claim:

1. In a shut off or selector valve, a body having a substantially cylindrical interior surface, end covers on said body, said body having inlet and outlet openings, a substantially cylindrical resilient split rotor arranged concentrically therein in sealing contact with said interior surface and having means providing an outlet therefrom adapted to be aligned with the body inlet and outlet openings, sealing means interposed between said rotor and said body to offer frictional resistance to rotation of said rotor, means arranged to rotate said rotor and connected thereto whereby on rotation said rotor will contract and on release thereof will re-assume a substantially liquid tight sealing contact with the interior surface of said body.

2. The structure as set forth in claim 1 wherein the sealing means is attached to the rotor and has openings therein to provide access to the rotor interior.

3. The structure as set forth in claim 1 in which the sealing means is attached to the body interior surface and has openings therein aligned with the body inlet and outlet openings.

4. The structure as set forth in claim 1 wherein one of said end covers has an inlet opening therein whereby liquid may be directed through the interior of the rotor selectively to either the body inlet or outlet opening.

5. In a valve of the shut off or selector types, a body having a substantially smooth cylindrical interior surface having openings therein, a resilient split rotor concentrically mounted therein in sealing relation with said interior surface having means providing access to the interior of the rotor, a rotor shaft connected to said rotor, a bearing means for said shaft mounted in the rotor, a disc member connected to each end of the rotor shaft within the rotor, projections on each of said disc members, inner projections on said rotor normally aligned with said disc member projections, means pivotally interconnecting the respective aligned projections whereby on rotation of said rotor shaft the rotor will contract to permit adjustment thereof to a desired position and upon release, the resilient rotor will return into sealing engagement with the body interior surface.

6. The structure as set forth in claim 5 wherein a layer of sealing material is attached to said body interior surface so as to provide openings in alignment with body openings.

7. A selector valve comprising a body having openings therein and having a substantially cylindrical interior surface, a resilient split rotor concentrically mounted therein, normally in sealing relation with said interior surface, and having means providing access to the interior of the rotor, control shaft means connected to said rotor, disc means connected to said rotor control shaft, means pivotally connecting said disc means to said rotor whereby on rotation of said control shaft the rotor will contract so as to be adjustable to a desired position and on release thereof the rotor will return to its normally sealing engagement with the interior surface of the body.

HOWARD NOYES.

References Cited in the file of this patent

UNITED STATES PATENTS

| Number | Name | Date |
|---|---|---|
| 516,534 | Hodges | Mar. 13, 1894 |
| 539,631 | Morrison | May 21, 1895 |
| 857,463 | Irwin | June 18, 1907 |
| 1,741,521 | Judell | Dec. 31, 1929 |
| 1,939,141 | Schultis | Dec. 12, 1933 |
| 2,063,699 | Schellin | Dec. 8, 1936 |
| 2,072,965 | Robinson | Mar. 9, 1937 |
| 2,105,331 | Rasmussen | Jan. 11, 1938 |
| 2,210,335 | Mueller | Aug. 6, 1940 |
| 2,511,477 | Mueller | June 13, 1950 |
| 2,516,425 | Sarver | July 25, 1950 |

FOREIGN PATENTS

| Number | Country | Date |
|---|---|---|
| 558,824 | Great Britain | Jan. 24, 1944 |